United States Patent

[11] 3,624,034

[72] Inventors John A. Price
Swarthmore;
Mary J. Stewart, Riddlewood, both of Pa.
[21] Appl. No. 37,838
[22] Filed May 15, 1970
[45] Patented Nov. 30, 1971
[73] Assignee FMC Corporation
Philadelphia, Pa.
Continuation-in-part of application Ser. No. 867,375, Oct. 17, 1969. This application May 15, 1970, Ser. No. 37,838

[54] SULFOPHENOXY MALONATE COMPOUNDS AND CATIONIC DYEABLE COPOLYESTERS CONTAINING SAME
10 Claims, No Drawings

[52] U.S. Cl. .................................................. 260/49,
8/55, 260/755, 260/485 J, 260/507 R
[51] Int. Cl. ........................................................ C08g 17/14
[50] Field of Search ........................................... 260/49,
755, 507, 485 J; 8/55

[56] References Cited
UNITED STATES PATENTS
3,018,272   1/1962   Griffing et al .................   260/75
3,238,180   3/1966   Wiloth ..........................   260/47
3,313,778   4/1967   Sakurai et al. .................   260/49

*Primary Examiner*—William H. Short
*Assistant Examiner*—L. L. Lee
*Attorneys*—Thomas R. O'Malley, George F. Mueller and Charles A. Haase ABSTRACT: Sulfophenoxy malonate compounds and copolyester resins utilizing said malonate compounds comprising the condensation product of (a) an aromatic dicarboxylic acid or its lower alkyl diester, (b) an aliphatic glycol, and (c) a minor amount of a substituted acid or ester thereof represented by the formula

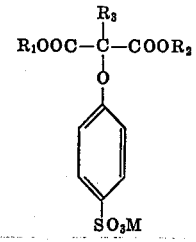

wherein $R_1$ and $R_2$ are both hydrogen or lower alkyl radicals, $R_3$ is hydrogen or a lower alkyl radical, and M is a metal.

SULFOPHENOXY MALONATE COMPOUNDS AND CATIONIC DYEABLE COPOLYESTERS CONTAINING SAME

This application is a continuation-in-part of our U.S. application Ser. No. 867,375, filed Oct. 17, 1969.

This invention relates to highly polymeric linear copolyester resins which have improved dyeability. More particularly, the present invention relates to novel copolyester resins which can be formed into filaments, films, or other shaped articles and which can be readily dyed with basic type dyes. The term "basic dye" is used herein to denote cationic organic dyes such as, for example, those containing sulfonium, oxonium, or quaternary ammonium functional groups.

Many types of random copolyesters have been described in the prior art and they can be prepared by various well-known processes. For example, copolyester resins can be prepared by a direct esterification and polycondensation process or by a transesterification and polycondensation process. In the case of the direct esterfication method, the reactants used consist of suitable dicarboxylic acids and diols; whereas, in a transesterification method, lower alkyl diesters of suitable dicarboxylic acids and diols are used as the initial reactants.

A copolyester resin, such as those of the present invention, which are suitable for filament- and film-forming purposes should have relatively high-intrinsic viscosity, preferably not less than about 0.60 (as determined in a 60 percent phenol—40 percent tetrachloroethane solution, wt./wt., at 30° C.), a carboxyl content value of below about 50 equivalents per million grams eq./$10^6$ gr. or meq./kg.), a suitably high-melting point and also exhibit a relatively colorless or white color. Additionally, especially for filament-forming purposes, it is very desirable and necessary in many instances that the polyester resin be dyeable with cationic or basic dyes.

It is an object of this invention to provide novel highly polymeric saturated copolyester resins.

It is another object of this invention to provide highly polymeric linear copolyester resins, which have physical and chemical properties which make them particularly well-suited for filament- and film-forming purposes.

It is a further object of the present invention to provide highly polymeric copolyester resins which are readily dyeable with basic type dyes.

These and other objects are accomplished in accordance with the present invention by providing a highly polymeric copolyester resin comprising the condensation polymerization product of (a) an aromatic dicarboxylic acid or its lower alkyl diester, (b) an aliphatic glycol, and (c) a minor amount of a substituted acid or ester thereof represented by the formula:

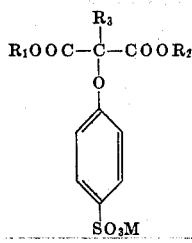

wherein $R_1$ and $R_2$ are both hydrogen or lower alkyl radicals containing from one to four carbon atoms, $R_3$ is hydrogen or a lower alkyl radical containing from one to six carbon atoms, and M is a metal.

The random copolyester resins of the present invention can be prepared as stated above by either a transesterification or direct esterification process. In either instance, all the reactants can be initially combined and charged into a suitable reactor wherein one of the subject processes is carried out.

For illustration purposes, the general structure of several preferred embodiments of the present invention can be represented by combining the following segments designated (1) and (2) or by combining segments (1), (2), and (3). In either of these examples, a minor percentage of 1,3-propanediol,2,2-diethyl-1,3-propanediol,2,2-dimethyl-1,4-butanediol, 2) and (3) would be present in the copolyester resin chain.

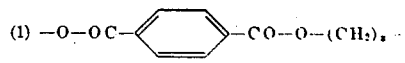

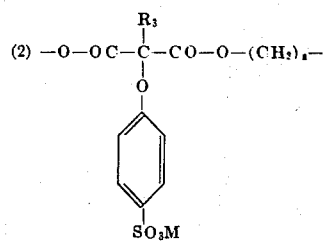

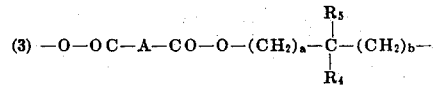

wherein $z$ is a positive integer of from two to six, $R_3$ is hydrogen or an alkyl radical having from one to six carbon atoms, M is a metal, "A" is a divalent saturated aromatic radical, $a$ and $b$ represent positive integers of from one to three, and $R_4$ and $R_5$ represent lower alkyl radicals containing from one to six carbon atoms.

It has been determined that a preferred group of copolyester resins of the present invention are those containing from about 0.5 to 10 mole percent of "secondary segments" represented by (2) above and from about 99.5 to 90 mole percent of "primary segments" represented by (1) above. Other preferred embodiments contain, in addition to the 0.5 to 10 mole percent of the "secondary segments," from 0.5 to 10 mole percent of segments represented by (3) above. Obviously, the copolyester resins of the present invention are not limited by such preferred concentrations. Copolyester resins containing smaller or greater concentrations of segments (2) and (3) above can also be prepared depending on the physical and chemical properties desired along with depth of dyeability needed.

The aliphatic glycols which can be employed in conjunction with the terephthalic acid or diesters thereof used to prepare the "primary segments" are those having the formula: $HO(CH_2)_zOH$, wherein $z$ is a positive integer of from two to six and cycloaliphatic glycols such as 1,4-cyclohexane dimethanol. Among the alkylene glycols that can be used to prepare the "primary segments" are, for example, ethylene glycol, 1,3-propylene glycol, and 1,6-hexylene glycol.

The saturated aromatic dibasic acid used as the acid component of the "primary segments" is terephthalic acid. Obviously, if the transesterification method is utilized to prepare the subject copolyesters, a corresponding lower alkyl diester of such a dibasic acid would be used instead of free acid. The alkyl groups of such a dialkyl ester can contain from one to four carbon atoms.

The ester segments (2) above designated "secondary segments" are derived from an alkylene glycol having the formula: $HO(CH_2)_zOH$, as described above wherein $z$ is from two to six or a cycloaliphatic glycol such as 1,4-cyclohexane dimethanol.

The substituted acid or esters thereof which are used to prepare segments (2) above can be any of those coming within the bounds of the formula:

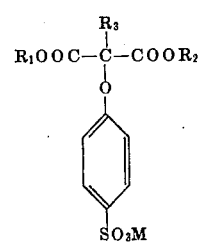

wherein $R_1$ and $R_2$ are both hydrogen or lower alkyl radicals containing from one to four carbon atoms, $R_3$ is hydrogen or a lower alkyl radical containing from one to six carbon atoms, and M represents any suitable metallic element preferably, however, because of ease of preparation, M is generally selected from the group consisting of the alkaline earth metals and alkali metals. For example, among the compounds that can be used are the metallic salts of diethyl 2-methyl-2-(p-sulfophenoxy) malonate, dimethyl 2-(p-sulfophenoxy) malonate, dibutyl 2-propyl-2-(p-sulfophenoxy) malonate, dimethyl 2-pentyl-2-(p-sulfophenoxy) malonate, dibutyl 2-hexyl-2-(p-sulfophenoxy) malonate, or their corresponding dicarboxylic acids and/or suitable mixtures thereof.

Specifically, the above defined sulfophenoxy malonate compounds can be readily prepared from p-hydroxybenzenesulfonic acid by first titrating same in a water solution with a solution of an alkali metal or alkaline earth metal at room temperature in order to obtain a corresponding dimetallic salt thereof. Then filter the resulting solution and evaporate the obtained filtrate to dryness at reduced pressure. The concentrate obtained is then slurried in acetone and filtered. The precipitate is then dried in vacuo at about 110° to 120° C. for 3 days to yield the corresponding dimetallic salt of p-hydroxybenzenesulfonic acid. For example, the above defined solutions of alkali and alkaline earth metals can be prepared from sodium hydroxide, calcium oxide, lithium hydroxide, potassium hydroxide or barium oxide.

The above-prepared (I) p-hydroxybenzenesulfonic acid, dimetallic salt, and (II) a dialkyl 2-halo-2-alkyl malonate compound at a mole ratio of about 1:1.2 respectively are placed in a large excess of dimethylformamide and heated at about 90° C. for 4 hours, then kept at room temperature overnight. [Alkyl group (1) can contain from one to four carbon atoms, alkyl groups (3) from one to six carbon atoms and halo group (2) can be chlorine bromine or iodine]. The resulting solution is then evaporated to dryness in vacuo and the concentrate obtained is recrystallized in boiling ethanol. The product obtained will be a dialkyl 2-alkyl-2-(p-sulfophenoxy) malonate, metallic salt. If it is desired to prepare a dialkyl 2-(p-sulfophenoxy) malonate, metallic salt, then obviously the reactant used (II above) would be a dialkyl 2-halo-malonate rather than the 2-alkyl substituted malonate.

If a diacid counterpart of the above described sulfophenoxy malonate diesters is desired, it can be prepared from the above described diesters by using standard saponification techniques known to those skilled in the present art. Among the malonate reactants (II) that can be used to prepare the subject sulfonated monomers are dimethyl 2-bromo-2-ethylmalonate, dibutyl 2-chloro-2-propylmalonate, dimethyl 2-bromo-2methylmalonate, diethyl 2-bromomalonate, dipropyl 2-chloromalonate, dimethyl 2-bromomalonate.

For a more specific illustration, diethyl 2-methyl-2-(p-sulfophenoxy) malonate, sodium salt, can be prepared as follows:

EXAMPLE A (a) A solution of 236 grams (1.0 mole) of a 65 percent aqueous p-hydroxybenzenesulfonic acid was titrated with a 4N sodium hydroxide solution to a pH of 10.5. The resulting solution was filtered and then evaporated to dryness at reduced pressure. The residue was then slurried in acetone and filtered. The precipitate obtained was dried in vacuo at 110° to 120° C. for 3 days to yield 236 grams of the disodium salt of p-hydroxybenzenesulfonic acid. (b) A mixture of 54.5 grams (0.25 mole) of p-hydroxybenzenesulfonic acid, disodium salt, and 111 grams (0.3 mole of diethyl 2-bromo-2-methylmalonate in 500 ml. of dry dimethylformamide was heated at about 90° C. for about 4 hours and then kept at room temperature overnight. The resulting solution was evaporated to dryness in vacuo. The residue was then slurried in boiling ethanol and filtered to give a white precipitate on cooling. The resulting compound was identified as diethyl 2-methyl-2-(p-sulfophenoxy) malonate, sodium salt.

The dicarboxylic acid counterpart of the above-prepared diethyl 2-methyl-2-(p-sulfophenoxy) malonate, sodium salt, is prepared as follows: Take 21.8 grams of diethyl 2-methyl-2-(p-sulfophenoxy) malonate, sodium salt, and mix with a solution of 28 grams of potassium hydroxide dissolved in 150 ml. of diethylene glycol. Reflux 4 hours. Cool to room temperature and acidify to pH 1.0 using dilute hydrochloric acid. The resulting precipitate is then filtered off and dried in vacuo to give 2-methyl-2-(p-sodiumsulfophenoxy) malonic acid.

The ester segments designated (3) above can be prepared from any gem-dialkyl glycol coming within the formula:

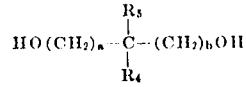

where $a$ and $b$ represent positive integers of from one to three and $R_4$ and $R_5$ represent lower alkyl radicals containing from one to six carbon atoms. Among those which can be used, for example, are 3,3-dipropyl-1,5-pentanediol, 2,2-dimethyl-1,3-propanediol, 2,2-diethyl-1,3-propanediol, 2,2-dimethyl-1,4-butanediol, 3,3-dimethyl-1,5-pentanediol, 2-ethyl-2-methyl-1,3-propanediol, and 2,2-dibutyl-1,3-propanediol.

Any suitable saturated aromatic dicarboxylic acid known in the polyester art can be used to prepare ester segments (3) above. The term "saturated aromatic dicarboxylic acid" is used herein to define any aromatic dicarboxylic acid which does not contain any ethylenic unsaturation. Among the dibasic acids which can be used are terephthalic acid, isophthalic acid, 4,4'-bibenzoic acid, p,p'-dicarboxydiphenyl propane, 4,4'-diphenylsulfone dicarboxylic acid, and 2,6-naphthalene dicarboxylic acid or suitable lower dialkyl esters thereof and any combination thereof.

In the case of the ester-interchange or transesterification method, a mole ratio of diol to suitable diester of from about 1:1 to about 15:1 may be used, but preferably from about 1.5:1 to about 2.6:1. The transesterification reaction is generally carried out at atmospheric pressure in an inert atmosphere such as nitrogen, initially at a temperature range from about 125° C. to about 250° C., but preferably from about 150° C. to 200° C. in the presence of a transesterification catalyst. An alkyl alcohol corresponding to the dialkyl ester of the dicarboxylic acid used is evolved and continuously removed by distillation. After a reaction period of 1 to 2 hours, the temperature of the reaction mixture is raised from about 200° C. to about 230° C. for approximately 1 to 3 hours in order to complete the reaction, form the desired polyester prepolymer and distill off any excess diol which is present.

Any of the well-known and suitable transesterification or ester-interchange catalysts, for example, lithium amide, lithium hydride, or zinc acetate can be used to catalyze the present transesterification reaction. In most instances, the transesterification catalyst is used in concentrations ranging from 0.01 percent to about 0.20 percent based on the weight of the dialkyl ester of the dicarboxylic acid used in the initial reaction mixture.

Alternatively, the preparation of the subject prepolymers or polyester resins can be achieved via the direct esterification method. In the case of the direct esterification method, a mole ratio of diol to dicarboxylic acid of from about 1.2:1 to about 15:1, but preferably from about 1.5:1 to about 2.6:1 is used. The initial steps of the direct esterification reaction are generally carried out at temperatures ranging from about 180° C. to about 280° C. in the absence of an oxygen-containing atmosphere at atmospheric or elevated pressure for about 2 to 4 hours to form the desired polyester prepolymer. For example, the reaction may be carried out in an atmosphere of nitrogen.

Any of the well-known and suitable first-stage direct esterification catalytic additives can be used in the preparation of the present copolyester resins via the direct esterification method. For example, triethylamine or calcium acetate may be used. The first-stage catalytic additives are generally employed at concentrations ranging from about $5\times10^{-5}$ mole to about $5\times10^{-2}$ mole of catalytic additive per mole of dicarboxylic acid used in the initial reaction mixture.

The polycondensation of the prepolymers prepared by one of the above processes is accomplished by adding a suitable polycondensation catalyst to the polyester prepolymer or prepolymers as defined above and heating the blend thereof under reduced pressures of within the range of about 0.05 mm. to 20 mm. of mercury while under agitation at a temperature of about 260° C. to 325° C. for from 2 to 4 hours. Any suitable polycondensation catalyst can be used, for example, antimony oxalate, antimony trioxide, or disodium lead ethylene diamine tetra-acetate.

Several preferred embodiments of the resins of the present invention are further illustrated by the following examples.

EXAMPLE I

One hundred forty six grams of dimethyl terephthalate, 9.4 grams of the sodium salt of diethyl 2-methyl-2-(p-sulfophenoxy) malonate, 99 mls. ethylene glycol, and 0.06 grams of lithium hydride was charged into a reaction vessel equipped with a nitrogen inlet, a distilling arm, heating means and stirring means. The reaction mixture was agitated and heated at atmospheric pressure to about 198° C. under a nitrogen blanket with stirring. The reaction mixture was held at about 198° C. for about 2 hours during which time methyl alcohol and other by products were distilled off. Then the temperature of the reaction mixture was allowed to rise to about 230° C. over a period of about 1 to distill off any remaining byproducts and thereby form the desired copolyester prepolymer. The prepolymer was then allowed to cool under an atmosphere of nitrogen.

EXAMPLE II

Fifty grams of the prepolymer product of example I was mixed with 0.02 grams of antimony trioxide and placed in a reaction vessel. This reaction mixture was then heated at about 280° C. under reduced pressure of about 0.1 mm. of mercury while under agitation for about 2 hours to bring about the polycondensation of the prepolymer and formation of a copolyester resin. The copolyester resin product formed had an intrinsic viscosity of 0.61, a diethylene glycol content of 0.93 weight percent, a carboxyl content value of 14 meg./kg., and a Y (C.I.E.) color value of 59.5.

For illustration purposes, the dyeability of the copolyester resin products prepared in the above examples were tested with cationic or basic type dyestuffs. The numerical values given below under the name "Cationic Dye Value" were obtained by measuring the reflectance of the dyed resin with a "Color-Eye" (model D–1) which is the trade name for a differential colorimeter manufactured by the Instrument Development Laboratories, Attleboro, Mass. The color values obtained are based on luminance (Y in the C.I.E. System) which is a measure of the proportion of the incidence light reflected relative to a white vitrolite standard and, therefore, a measure of the whiteness of the copolyester resin product being evaluated. Based on a theoretically possible Y value of 100, the higher the Y value, the whiter the resin product. Correspondingly, the lower the Y value or number, the more deep or intense the color of the dyed resin product. The determination of Y in the C.I.E. System as set forth in the examples and hereinafter set forth was carried out by using molded plaques of the polyester resin product having the dimensions 1"×1"×1/16" which were prepared on a Carver Press.

The prepared molded plaques of the polyester resin samples to be evaluated for dyeability were then subjected to the following dyeing procedures.

Cationic Dye Test

A dye bath was prepared containing 1.25 g. Sevron Blue ER, 10 g. Carolid 3F carrier, 12.5 g. Na$_2$SO$_4$, and 225 mls. water. This bath was heated to 120° F. and the samples entered. The bath containing the samples was raised to a boil over a 30-minute period and held at a boil for another 60 minutes. Two scour baths were prepared containing 6.25 mls. of a 1 percent Igepon T–51 Solution, 3.1 mls. of a 1 percent Na$_2$CO$_3$ solution, and 240 mls. water respectively. The samples were scoured in these baths at 140° F. for 15 minutes each and then air dried.

The copolyester resin product of example II above when dyed according to the above-described cationic dyeing procedure had a cationic dye value or Y value of 9.7 A polyethylene terephthalate homoprepolymer prepared with the same catalyst system and under the same conditions as example II had a cationic dye value or Y value of 17.5.

Other copolyester resins are prepared from dimethyl terephthalate, ethylene glycol, and a minor amount of dibutyl 2-hexyl-2-(p-sulfophenoxy) malonate, sodium salt, and in another instance, a minor amount of dibutyl 2-propyl-2-(p-sulfophenoxy) malonate, sodium salt, by the same procedure as set forth above in examples I and II and the resulting copolyester resin products exhibit excellent cationic dye affinity.

Fibers were spun from the copolyester resin product of example II and resulting fiber showed excellent dye affinity and retainability The results in the above example clearly show the novel and excellent results achieved by the copolyester resins of the present invention which are particularly well suited for filament- and film-forming purposes.

The copolyester resin products of the present invention are considered to be particularly desirable due to the fact that the primary ester units comprising ethylene terephthalate and similar monomeric structures need only be modified to a slight degree with the other specified modified ester units of the present invention to achieve the desired results.

We claim:

1. A cationic dyeable copolyester resin consisting essentially of the condensation polymerization product of (a) an aromatic dicarboxylic acid or its lower alkyl diester, (b) a glycol selected from the group consisting of aliphatic glycols and cycloaliphatic glycols, and (c) a minor amount which is sufficient to impart cationic dyeability of a substituted acid or ester thereof represented by the formula:

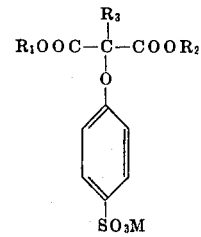

wherein $R_1$ and $R_2$ are both hydrogen or lower alkyl radicals containing from one to four carbon atoms, $R_3$ is hydrogen or a lower alkyl radical containing from one to six carbon atoms, and M is a metal selected from the group consisting of alkaline earth metals and alkali metals.

2. A composition of claim 1 wherein (a) is terephthalic acid or a lower alkyl diester thereof.

3. A composition of claim 2 wherein (b) is ethylene glycol.

4. A composition of claim 1 wherein (a) is terephthalic acid or a lower alkyl diester thereof and a minor amount of another saturated aromatic dicarboxylic acid or lower alkyl diester thereof, (b) is a glycol represented by the formula: HO(CH$_2$)$_z$OH, wherein z is a positive integer of from 2 to 6 and (c) is a substituted acid or ester thereof represented by the formula:

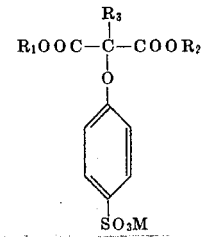

wherein $R_1$ and $R_2$ are both hydrogen or lower alkyl radicals containing from one to four carbon atoms, $R_3$ is hydrogen or a lower alkyl radical containing from one to six carbon atoms, and M is a metal selected from the group consisting of alkali 5. A composition of claim 1 wherein (a) is terephthalic acid or a lower alkyl diester thereof, (b) is a mixture of a glycol represented by the formula: $HO(CH_2)_zOH$, wherein $z$ is a positive integer of from 2 to 6 and a minor amount of another glycol represented by the formula:

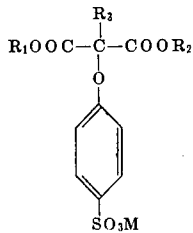

wherein $a$ and $b$ represent positive integers of from 1 to 3, $R_4$ and $R_5$ represent lower alkyl radicals containing from one to six carbon atoms, and (c) is a substituted acid or ester thereof represented by the formula:

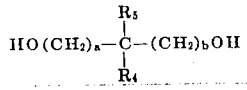

wherein $R_1$ and $R_2$ are both hydrogen or lower alkyl radicals containing from one to four carbon atoms, $R_3$ is hydrogen or a lower alkyl radical containing from one to six carbon atoms, and M is a metal selected from the group consisting of alkaline earth metals and alkali metals.

6. A composition of claim 1 wherein (a) is dimethyl terephthalate, (b) is ethylene glycol, and (c) is the sodium salt of diethyl 2-methyl-2-(p-sulfophenoxy) malonate.

7. A composition of claim 1 wherein (a) is terephthalic acid, (b) is ethylene glycol, and (c) is methyl-2-(p-sodiumsulfophenoxy) malonic acid.

8. A composition of claim 1 wherein (a) is dimethyl terephthalate, (b) is ethylene glycol, and (c) is an alkali metal or alkaline earth metal salt of dimethyl 2-ethyl-2-(p-sulfophenoxy) malonate.

9. A composition of claim 8 wherein (c) is an alkali metal or alkaline earth metal salt of dimethyl 2-(p-sulfophenoxy) malonate.

10. A copolyester resin consisting essentially of a linear alkylene terephthalate polymer containing from about 0.5 to 10 mole percent of segments represented by the formula:

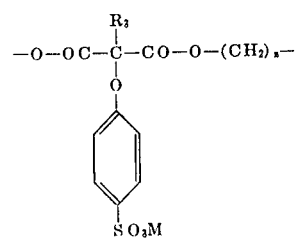

wherein $z$ is a positive integer of from 2 to 6, $R_3$ hydrogen or an alkyl radical having from one to six carbon atoms and M is a metal selected from the group consisting of alkaline earth metals and alkali metals.

* * * * *